(12) United States Patent
Yoshizawa et al.

(10) Patent No.: US 12,506,207 B2
(45) Date of Patent: Dec. 23, 2025

(54) BATTERY MODULE, BATTERY PACK, AND METHOD FOR MANUFACTURING BATTERY MODULE

(71) Applicant: HONDA MOTOR CO., LTD., Tokyo (JP)

(72) Inventors: Yosuke Yoshizawa, Saitama (JP); Yasuhiko Saijo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 569 days.

(21) Appl. No.: 17/952,825

(22) Filed: Sep. 26, 2022

(65) Prior Publication Data

US 2023/0097853 A1  Mar. 30, 2023

(30) Foreign Application Priority Data

Sep. 30, 2021 (JP) ................................. 2021-162012

(51) Int. Cl.
 *H01M 50/242* (2021.01)
 *H01M 10/058* (2010.01)
 *H01M 50/547* (2021.01)

(52) U.S. Cl.
 CPC ....... *H01M 50/242* (2021.01); *H01M 10/058* (2013.01); *H01M 50/547* (2021.01)

(58) Field of Classification Search
 CPC . H01M 50/242; H01M 50/547; H01M 10/058
 See application file for complete search history.

(56) References Cited

U.S. PATENT DOCUMENTS

| | | |
|---|---|---|
| 2010/0047676 A1 | 2/2010 | Park et al. |
| 2011/0311848 A1 | 12/2011 | Garascia et al. |
| 2014/0287288 A1 | 9/2014 | Takeda et al. |
| 2015/0287964 A1 | 10/2015 | Park et al. |
| 2017/0301964 A1 | 10/2017 | Murakami et al. |
| 2019/0341589 A1 | 11/2019 | Kato |
| 2019/0372182 A1 | 12/2019 | Takayasu |

FOREIGN PATENT DOCUMENTS

| | | |
|---|---|---|
| CN | 213340564 U | 6/2021 |
| JP | 2008-078069 A | 4/2008 |
| JP | 2008-300692 A | 12/2008 |
| JP | 2010-500721 A | 1/2010 |
| JP | 2014-186806 A | 10/2014 |
| JP | 6442907 B2 | 12/2018 |
| JP | 2019-079780 A | 5/2019 |
| JP | 2019-083087 A | 5/2019 |
| JP | 2019-194957 A | 11/2019 |
| WO | WO 2016/067517 A1 | 5/2016 |
| WO | WO 2018/150672 A1 | 8/2018 |
| WO | WO 2019/082751 A1 | 5/2019 |
| WO | WO 2019/082752 A1 | 5/2019 |

OTHER PUBLICATIONS

Oct. 22, 2024, Translation of Japanese Office Action issued for related JP Application No. 2021-162012.

*Primary Examiner* — Jane J Rhee
(74) *Attorney, Agent, or Firm* — Paratus Law Group, PLLC (57) ABSTRACT

A battery module includes a plurality of solid-state battery cells arranged in a first direction and extending in a second direction orthogonal to the first direction, and a cushion block having elasticity and provided with a plurality of slots which accommodate the plurality of solid-state battery cells. The battery module is configured by inserting the plurality of solid-state battery cells into the plurality of slots.

12 Claims, 10 Drawing Sheets

BATTERY MODULE, BATTERY PACK, AND METHOD FOR MANUFACTURING BATTERY MODULE

CROSS-REFERENCE TO RELATED APPLICATIONS

This application is based on and claims priority under 35 USC 119 from Japanese Patent Application No. 2021-162012 filed on Sep. 30, 2021.

TECHNICAL FIELD

The present disclosure relates to a battery module, a battery pack, and a method for manufacturing the battery module.

BACKGROUND ART

In recent years, as a specific measure against global climate change, efforts for realizing a low-carbon society or a decarbonized society have become active. Also, in a battery module of a vehicle or the like, a reduction in a $CO_2$ emission has been strongly required, and electrification of a drive source has been progressing rapidly. Specifically, a vehicle including an electric motor as a drive source of the vehicle and a battery as a secondary battery capable of supplying an electric power to the electric motor, such as an electrical vehicle or a hybrid electrical vehicle, has been developed.

A battery cell constituting a battery expands or contracts in volume in accordance with a charge capacity. Therefore, when the battery is charged, the battery module expands, and when the battery is discharged, the battery module contracts. In particular, this tendency is remarkable in an all-solid-state battery using a solid electrolyte.

JP-B2-6442907 describes that an array body, in which a plurality of battery cells is arranged, is sandwiched between elastic bodies to be modularized. JP-A-2008-078069 describes that a cushioning member having a cushioning property is disposed in a container body having a plurality of recesses for housing unit cells. JP-A-2008-300692 describes that a power storage module is formed by filling a resin material into an exterior case in which a plurality of power storage cells is accommodated.

However, devices described in JP-B2-6442907 and JP-A-2008-078069 have a large number of parts and a complicated structure, and there is room for improvement. Further, in JP-A-2008-300692, a shape of the resin material depends on a shape of the power storage cell, and thus a degree of freedom in the shape of the resin material is low; and there is room for improvement.

SUMMARY

The present disclosure provides a battery module, a battery pack, and a method for manufacturing the battery module, which can absorb expansion or contraction of a solid-state battery cell and have a high degree of freedom in a shape of a cushion material.

Aspect of the present disclosure relates to a battery module including:

a plurality of solid-state battery cells arranged in a first direction and extending in a second direction orthogonal to the first direction; and a cushion block having elasticity and provided with a plurality of slots which accommodate the plurality of solid-state battery cells, in which the battery module is configured by inserting the plurality of solid-state battery cells into the plurality of slots.

Further, aspect of the present disclosure relates to a battery pack provided with a plurality of battery modules described above, in which:

the solid-state battery cells are provided with positive electrode terminals and negative electrode terminals on one side in the second direction;

the positive electrode terminals and the negative electrode terminals of the solid-state battery cells are exposed from openings of the slots;

the openings of the slots are provided on a second surface of the cushion block; and adjacent battery modules are disposed such that second surfaces thereof are not adjacent to each other.

Further, aspect of the present disclosure relates to a method for manufacturing a battery module, the method including:

generating a plurality of slots arranged in a first direction and extending in a second direction orthogonal to the first direction in a cushion block having elasticity; and inserting the plurality of solid-state battery cells into the plurality of slots.

According to the present disclosure, a shape of a slot can be designed regardless of a shape of a solid-state battery cell, and expansion or contraction of the solid-state battery cell can be absorbed.

DESCRIPTION OF EMBODIMENTS

Hereinafter, a battery module according to each embodiment of the present disclosure will be described with reference to the drawings. In the following description, for the sake of convenience, three orthogonal directions will be described using an orthogonal coordinate system in a three-dimensional space having a front-rear direction, a left-right direction, and an up-down direction. In the drawings, a front side is indicated as Fr, a rear side as Rr, a right side as R, a left side as L, an upper side as U, and a lower side as D.

First Embodiment

Figure 1:
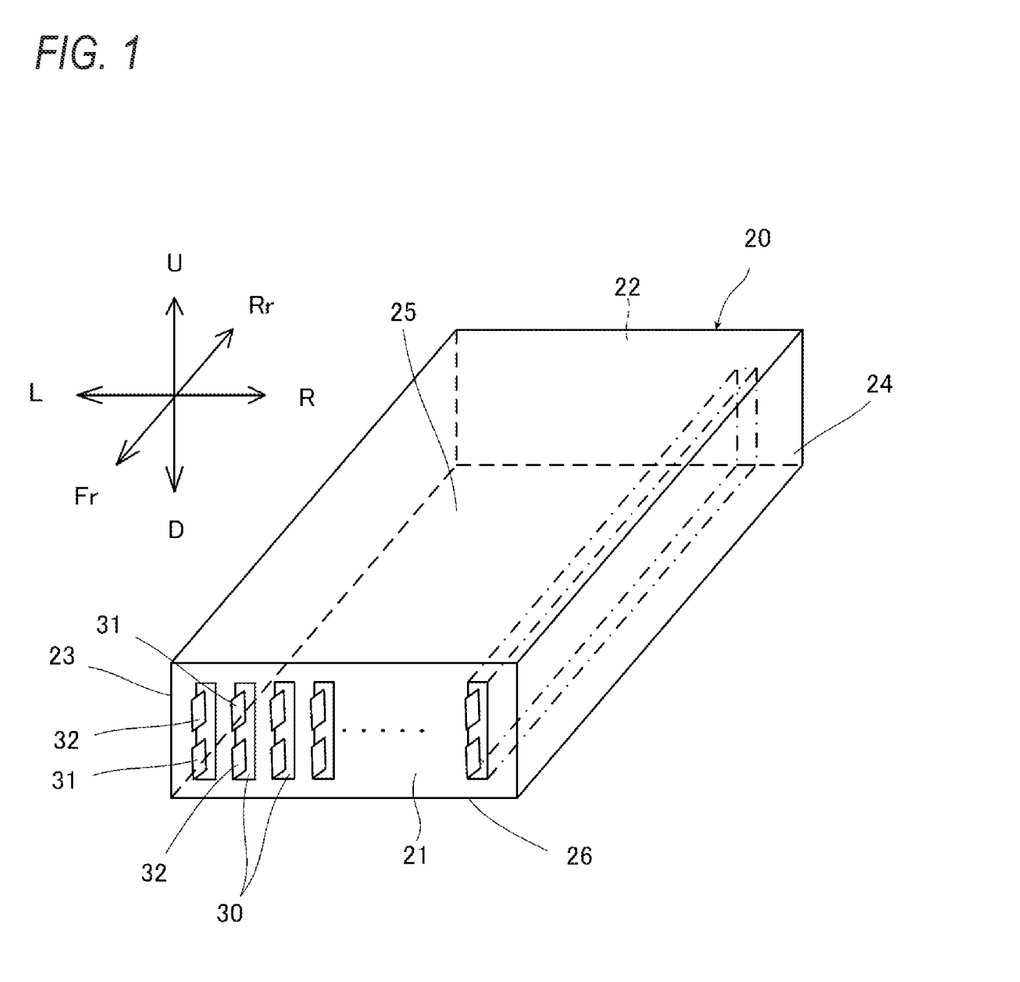
FIG. 1 is a perspective view of a battery module according to a first embodiment of the present disclosure.

As illustrated in FIG. 1, a battery module 10 of a first embodiment of the present disclosure includes a cushion block 20 having a substantially rectangular parallelepiped shape having a front surface 21, a rear surface 22, a left surface 23, a right surface 24, an upper surface 25, and a lower surface 26, and a plurality of solid-state battery cells 30 disposed in the cushion block 20.

The cushion block 20 is made of an elastic material such as resin and rubber Examples of the resin include silicone-based, fluorine-based, urethane-based, amide-based, olefin-based, styrene-based, ester-based, and vinyl chloride-based elastomers. The urethane-based, amide-based, olefin-based, and ester-based elastomers are hard and easy to ensure a load surface pressure, and the amide-based, styrene-based, urethane-based, ester-based, and vinyl chloride-based elastomers have a high coefficient of restitution. The urethane-based elastomer is most preferable in that the cost is lower than that of the rubber and other elastomers, the load surface pressure is easily ensured, and the coefficient of restitution is high.

Figure 2:
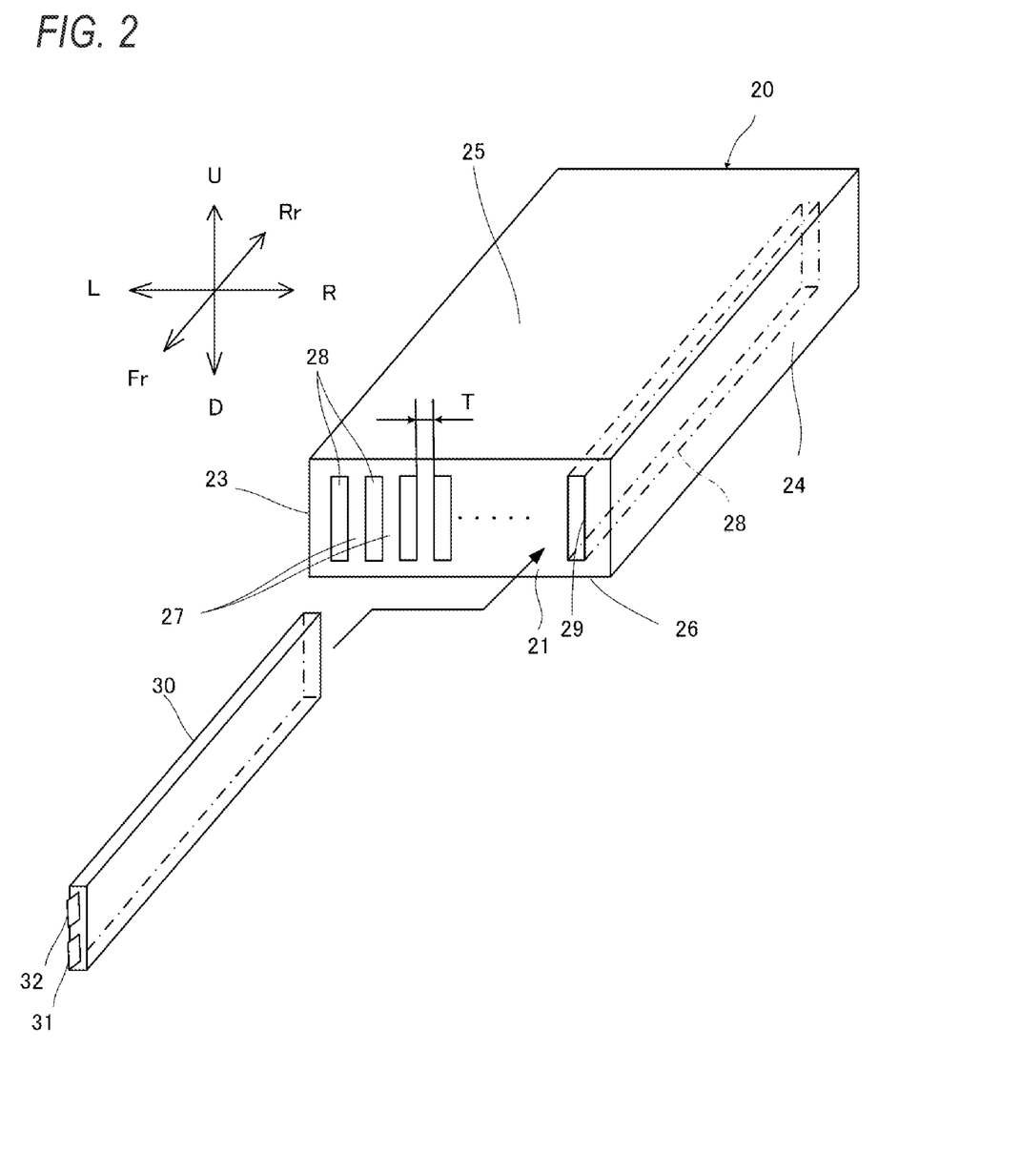
FIG. 2 is an explanatory view illustrating a step of inserting a solid-state battery cell into a slot of a cushion block in the battery module of FIG. 1.

As illustrated in FIG. 2, the cushion block 20 is provided with a plurality of slots 28 arranged in the left-right direction and extending in the front-rear direction. Each slot 28 has a rectangular shape whose cross section is long in the up-down direction and short in the left-right direction. Further, each slot 28 has an opening 29 which is opened to the front surface 21 of the cushion block 20, and extends straight toward the rear surface 22. Each slot 28 may or may not penetrate the cushion block 20 in the front-rear direction. In an example of FIG. 1, each slot 28 does not penetrate the cushion block 20.

In other words, the cushion block 20 is provided with a plurality of partition walls 27 at predetermined intervals in the left-right direction, and upper end portions and lower end portions of the plurality of partition walls 27 are connected by the upper surface 25 and the lower surface 26. Of the plurality of partition walls 27, the partition wall 27 located on the leftmost side constitutes the left surface 23, and the partition wall 27 located on the rightmost side constitutes the right surface 24.

Although not illustrated, the solid-state battery cell has an all-solid-state battery positive electrode, an all-solid-state battery negative electrode, and a solid electrolyte disposed between the all-solid-state battery positive electrode and the all-solid-state battery negative electrode, and charging and discharging of the solid-state battery cell are performed by exchanging lithium ions between the all-solid-state battery positive electrode and the all-solid-state battery negative electrode via the solid electrolyte. The solid electrolyte is not particularly limited as long as the solid electrolyte has lithium ion conductivity and insulating properties, and a material generally used for an all-solid-state lithium-ion battery may be used. Examples thereof include inorganic solid electrolytes such as sulfide solid electrolyte materials, oxide solid electrolyte materials, and lithium-containing salts, polymer-based solid electrolytes such as polyethylene oxide, and gel-based solid electrolytes containing lithium-containing salts or lithium ion conductive ionic liquids. A form of a solid electrolyte material is not particularly limited, and examples thereof include a particulate form.

Each solid-state battery cells 30 have a substantially rectangular parallelepiped shape elongated in the front-rear direction, and a positive electrode current collector tab 31 and a negative electrode current collector tab 32 protrude from the front surface. A solid-state battery cell has a length in the up-down direction longer than a length in the left-right direction. A length in the front-rear direction is longer than the length in the up-down direction. Therefore, in the solid-state battery cell 30, areas of surfaces in the left-right direction, that is, areas of the left surface and the right surface are the widest. Note that the solid-state battery cell 30 does not need to be of a laminated type, and may be of a square type or a cylindrical type.

As a characteristic of a solid-state battery cell, a volume changes according to a charge capacity (State of Charge). For example, in a case of a charge capacity of 75% as a reference, the solid-state battery cell expands when the charge capacity is 100% as compared with when the charge capacity is 75%, and the solid-state battery cell contracts w % ben the charge capacity is 50% as compared with when the charge capacity is 75%. It is known that the solid-state battery cell 30 expands due to a temperature change or aging degradation.

As illustrated in FIG. 2, the battery module 10 is configured by inserting the plurality of solid-state battery cells 30 into the plurality of slots 28. More specifically, the solid-state battery cell 30 is inserted into the slot 28 from the opening 29 of the slot 28 such that the positive electrode current collector tab 31 and the negative electrode current collector tab 32 protrude from the opening 29.

Accordingly, the plurality of solid-state battery cells 30 are accommodated in the cushion block 20 to be arranged in the left-right direction and extend in the front-rear direction. The cushion block 20 is provided to surround an outer periphery of the solid-state battery cells 30 in a cross section orthogonal to the front-rear direction. That is, the solid state battery cells 30 are surrounded by the cushion block 20 at least in four directions of a left direction, a right direction, an upper direction, and a lower direction.

In adjacent solid-state battery cells 30, the surfaces having a larger area in the left-right direction face each other. When the solid-state battery cell 30 expands or contracts, the surfaces having a larger area in the left-right direction are most affected. Therefore, for example, in a case where the charge capacity of the battery module 10 is large, when the solid-state battery cell 30 expands, the length of the solid-state battery cell 30 in the left-right direction increases. On the other hand, for example, in a case where the charge capacity of the battery module 10 is small, when the solid-state battery cell 30 contracts, the length of the solid-state battery cell 30 in the left-right direction is shortened.

In the battery module 10 of the present embodiment configured as described above, since the partition wall 27 of the cushion block 20 having a predetermined width (length in the left-right direction) T is interposed between the adjacent solid-state battery cells 30 (see FIG. 2), a change in the length of the solid-state battery cell 30 in the left-right direction is absorbed by elasticity of the partition wall 27 of the cushion block 20. Further, since an outer periphery of the solid-state battery cells 30 is surrounded by the cushion block 20, expansion or contraction of the solid-state battery cells 30 is further absorbed by the elasticity of the cushion block 20. That is, the partition wall 27 sandwiched between the adjacent solid-state battery cells 30 contracts when the solid-state battery cells 30 expand, and expands when the expanded solid-state battery cells 30 contract. At this time, since an upper end portion and a lower end portion of the partition wall 27 are connected by the upper surface 25 and the lower surface 26, restoration of the partition wall 27 is assisted by the upper surface 25 and the lower surface 26. By improving restorability, the partition wall 27 can be made thin, thereby improving energy density of the battery module 10.

A method for manufacturing the battery module 10 includes: generating the plurality of slots 28 in the cushion block 20 having elasticity; and inserting the plurality of solid-state battery cells 30 into the plurality of slots 28. In this way, since the solid-state battery cells 30 are inserted into the slots 28 provided in advance in the cushion block 20, a shape of the slots can be properly designed regardless of a shape of the solid-state battery cells 30.

Figure 3:
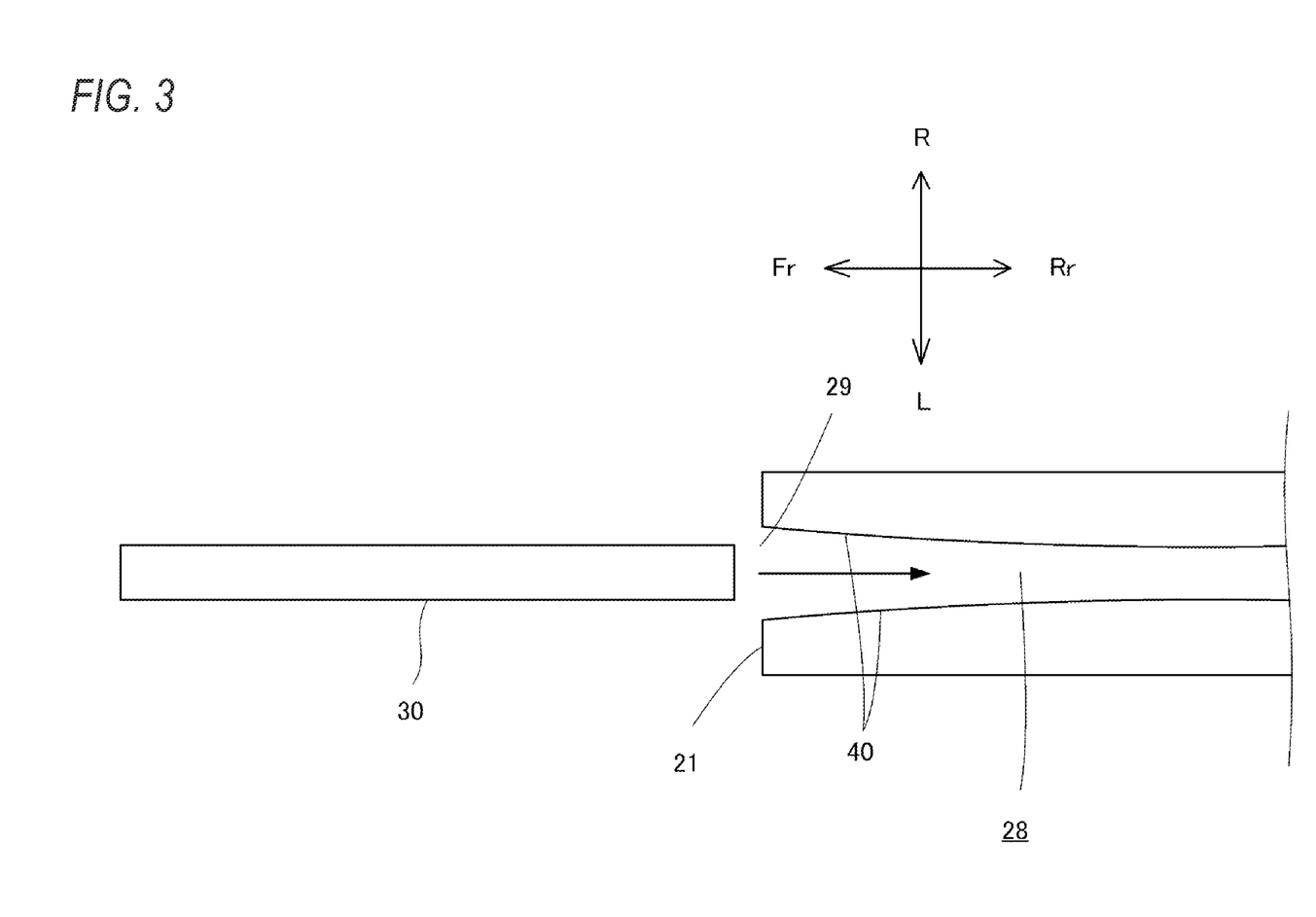
FIG. 3 is a diagram illustrating a cushion block according to a first modification.

FIG. 3 is a diagram illustrating the cushion block 20 according to a first modification.

In the cushion block 20 of the first modification, a guide portion 40 is provided in the slot 28, the guide portion 40 being curved such that a width of the slot 28 in the left-right direction narrows toward a rear side from the opening 29 in the front-rear direction in a state where the solid-state battery cell 30 is not inserted into the slot 28.

With such the cushion block 20, when the solid-state battery cell 30 is inserted into the slot 28, the solid-state battery cell 30 can be received by the opening 29 having a wide width in the left-right direction. By the guide portion 40, the solid-state battery cell 30 is guided rearward to a center of the slot 28. Accordingly, the solid-state battery cell 30 can be easily inserted into the slot 28. The guide portion 40 may be inclined such that the width of the slot 28 in the left-right direction narrows as a distance from the opening 29 increases in the front-rear direction.

Figure 4:
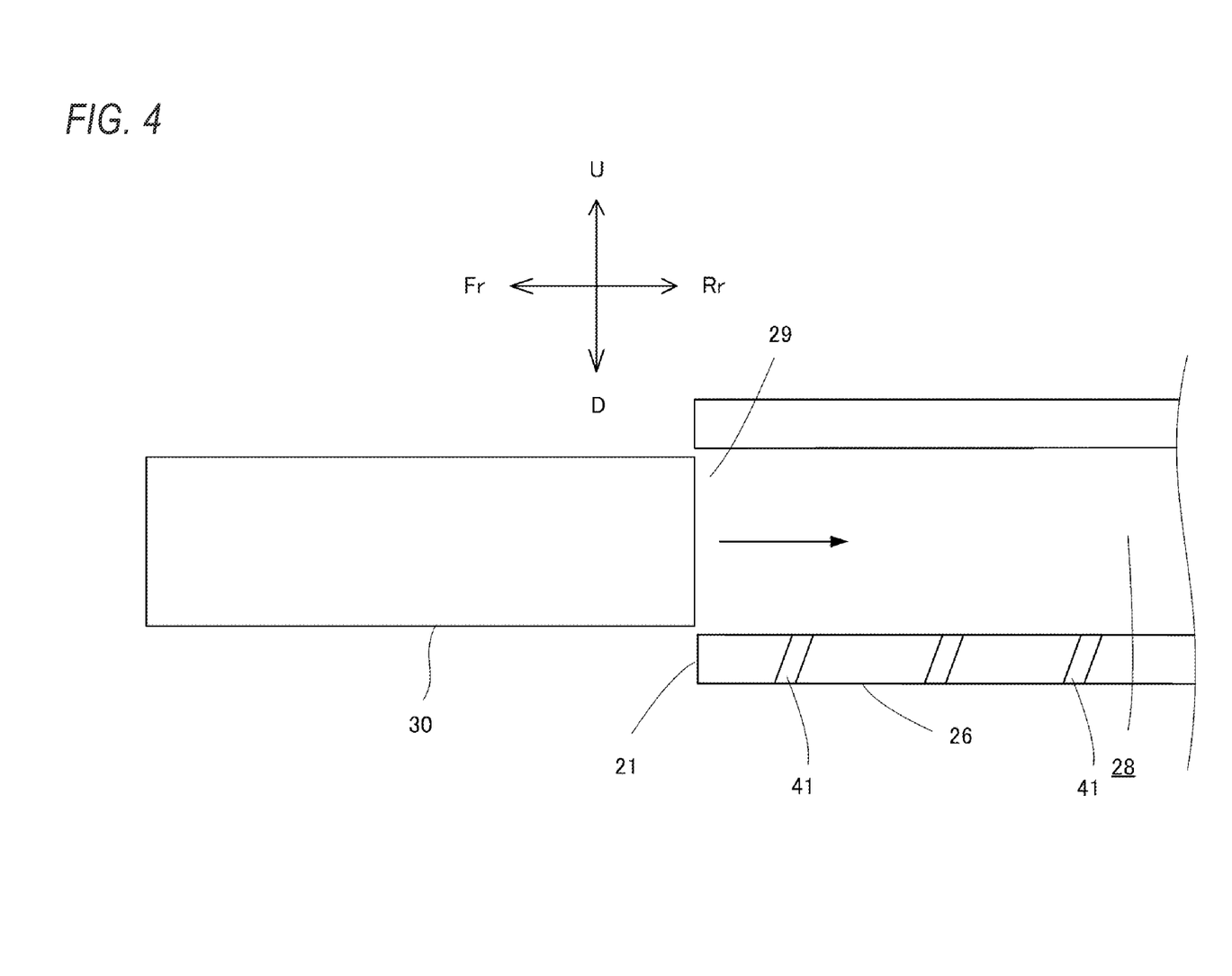
FIG. 4 is a diagram illustrating a cushion block according to a second modification.

FIG. 4 is a diagram illustrating the cushion block 20 according to a second modification.

The cushion block 20 of the second modification is provided with through holes 41 which communicate the lower surface 26 of the cushion block with the slot 28. Therefore, the solid-state battery cell 30 can be cooled through the through holes 41.

Further, the through holes 41 are inclined so as to be closer to the slot 28 from the lower surface 26 of the cushion block as a distance from the opening 29 increases rearward in the front-rear direction. Therefore, even when the through holes 41 are provided in the slot 28, the through holes 41 are less likely to be caught on the solid-state battery cell 30 when the solid-state battery cell 30 is inserted into the slot 28.

Figure 5:
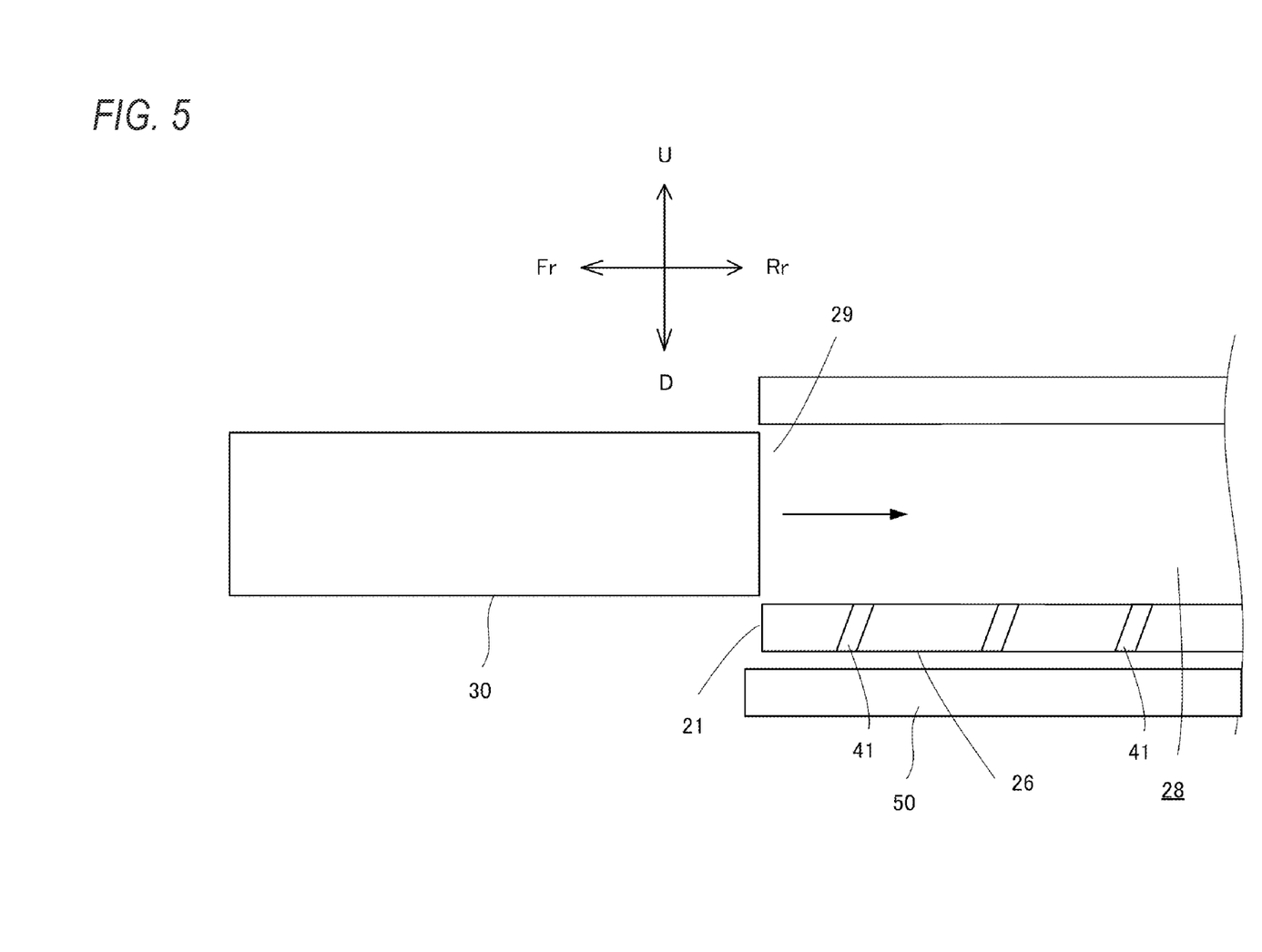
FIG. 5 is a diagram illustrating a cushion block according to a third modification.

FIG. 5 is a diagram illustrating the cushion block 20 according to a third modification.

Similarly to the cushion block 20 of the second modification, the cushion block 20 of the third modification is provided with the through holes 41 which communicate the lower surface 26 of the cushion block with the slot 28. In the third modification, a water jacket 50 is disposed on the lower surface 26 of the cushion block. In this way, since the lower surface 26 of the cushion block is a surface extending along the water jacket 50, air cooled by the water jacket 50 is supplied to the solid-state battery cell 30 via the through holes 41. Therefore, the solid-state battery cell 30 can be further cooled through the through holes 41.

Figure 6:
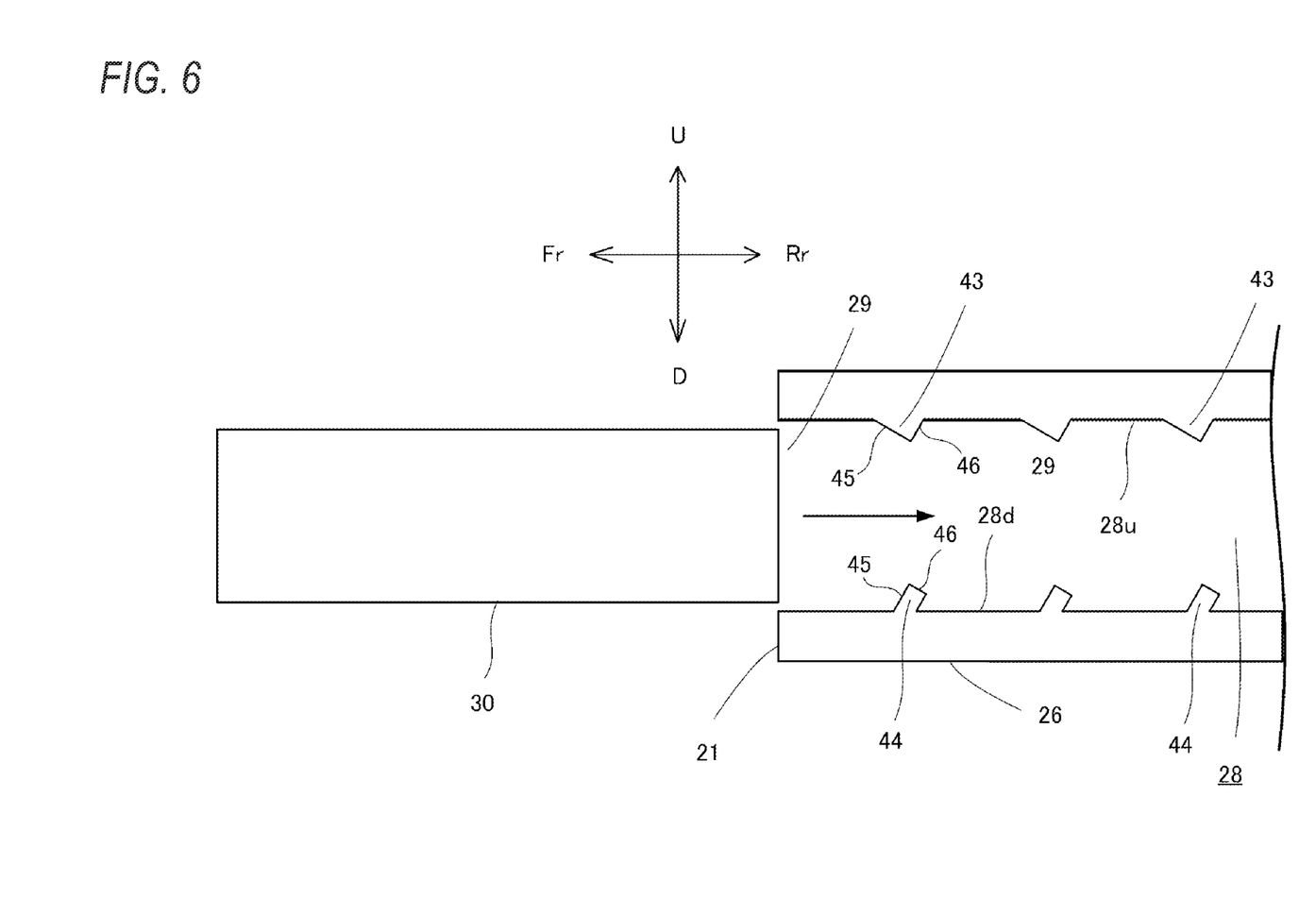
FIG. 6 is a diagram illustrating a cushion block according to a fourth modification.

FIG. 6 is a diagram illustrating the cushion block 20 according to a fourth modification.

In the cushion block 20 of the fourth modification, a first protrusion 43 protruding downward is provided on an upper wall 28*u* of the slot 28, and a second protrusion 44 protruding upward is provided on a lower wall 28*d*. The first protrusion 43 has a triangular cross section, and the second protrusion 44 has a quadrangular cross section. Each of the protrusions 43 and 44 is provided with a guide portion 45 on the opening 29 side, the guide portion 45 being inclined such that a width of the slot 28 in the up-down direction narrows as a distance from the opening 29 increases rearward in the front-rear direction. Each of the protrusions 43 and 44 is provided with a hook portion 46 on a side opposite to the opening 29, the hook portion 46 being inclined such that the width of the slot 28 in the up-down direction increases as the distance from the opening 29 increases in the front-rear direction.

With such the cushion block 20, when the solid-state battery cell 30 is inserted into the slot 28, the solid-state battery cell 30 is guided rearward to a center of the slot 28 by the guide portion 45, and thus the solid-state battery cell 30 can be easily inserted into the slot 28. Further, even if vibration or the like acts on the solid-state battery cell 30 after the solid-state battery cell 30 is inserted into the slot 28, the solid-state battery cell 30 is less likely to come off due to the hook portion 46. The first protrusion 43 may be provided on both of the upper wall 28*u* and the lower wall 28*d*, the second protrusion 44 may be provided on both of the upper wall 28*u* and the lower wall 28*d*, and the first protrusion 43 or the second protrusion 44 may be provided on one of the upper wall 28*u* and the lower wall 28*d*.

Figure 7:
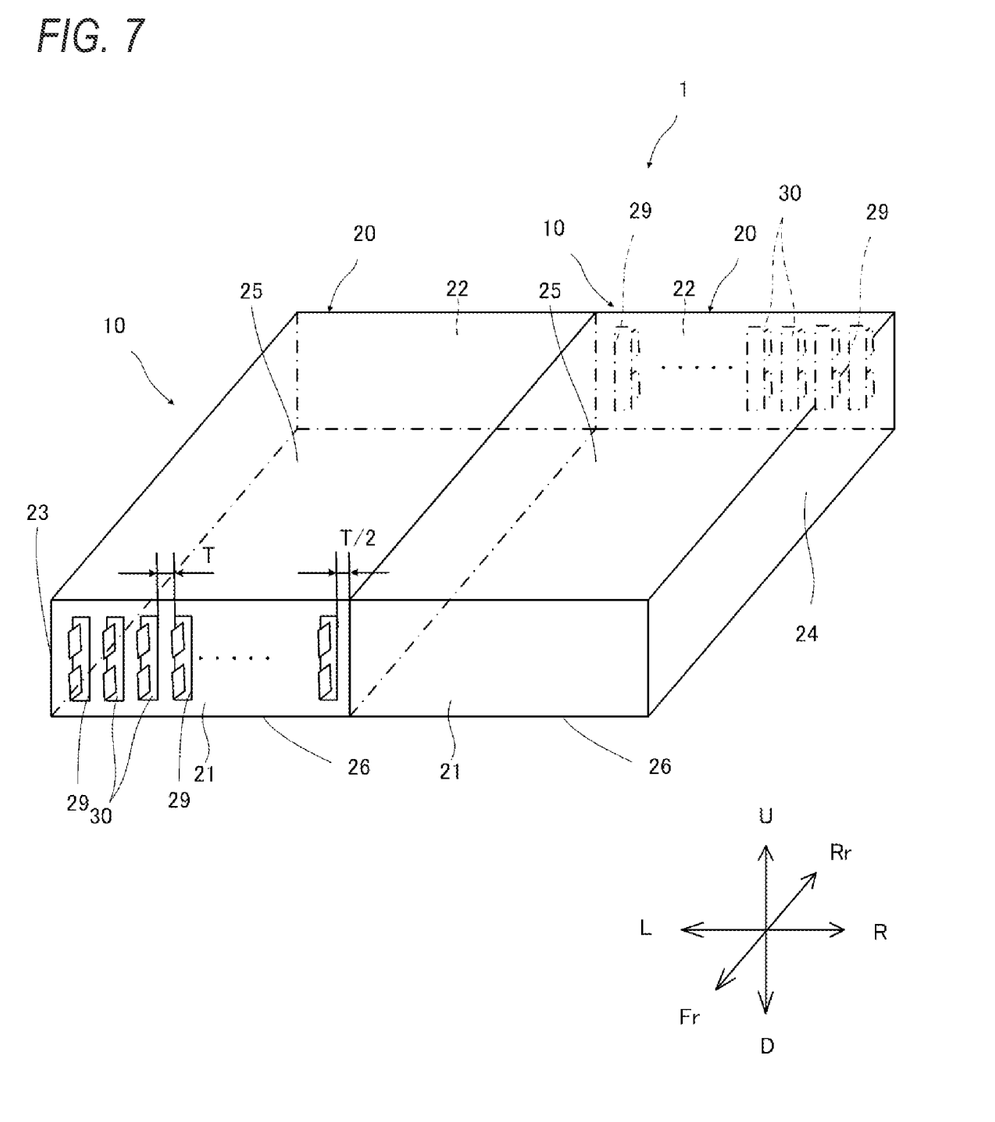
FIG. 7 is a perspective view of a battery pack according to an embodiment of the present disclosure.

FIG. 7 is a perspective view of a battery pack 1 configured by arranging two battery modules 10 in the left-right direction.

In the battery pack 1 of the present embodiment, the opening 29 of the slot 28 is disposed on the front surface 21 of the battery module 10 on one side (left side in the present embodiment) in the left-right direction. In contrast, in the battery module 10 on the other side (right side in the present embodiment) in the left-right direction, the opening 29 of the slot 28 is disposed on the rear surface 22. In other words, battery modules adjacent to each other in the left-right direction are arranged such that surfaces on which the openings 29 are formed are not adjacent to each other.

The solid-state battery cell 30 generally tends to expand and contract greatly in a vicinity of the positive electrode current collector tab 31 and the negative electrode current collector tab 32. In the battery pack 1 of the present embodiment, since the adjacent battery modules 10 are arranged such that the positive electrode current collector tab 31 and the negative electrode current collector tab 32 are not adjacent to each other, it is possible to prevent from occurring local expansion in the battery pack 1. When the battery modules 10 are arranged in the left-right direction, a width (length in the left-right direction) of the partition wall 27 of the cushion block 20 sandwiched between the adjacent battery modules 10 is preferably T/2. By setting a total width (length in the left-right direction) of two adjacent partition walls 27 to T, the partition wall 27 between the adjacent solid-state battery cells 30 can have the same width as other partition walls 27, and more solid-state battery cells 30 can be mounted.

Figure 8:
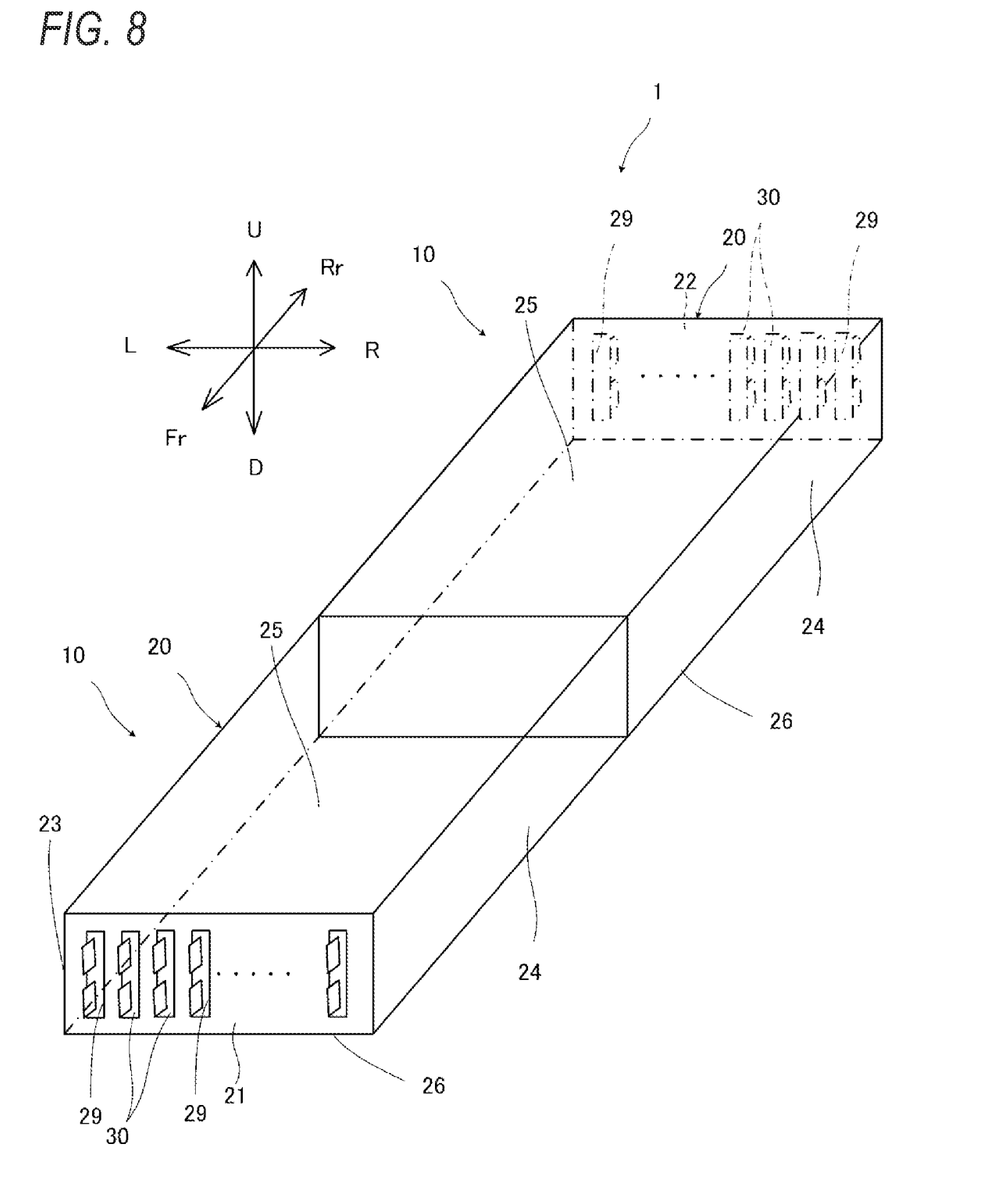
FIG. 8 is a perspective view of a battery pack according to another embodiment of the present disclosure.

FIG. 8 is a perspective view of the battery pack 1 configured by arranging two battery modules 10 described above in the front-rear direction.

In the battery pack 1 of the present embodiment, the opening 29 of the slot 28 is disposed on the front surface 21 of the battery module 10 on one side (front side in the present embodiment) in the front-rear direction. In contrast, in the battery module 10 on the other side (rear side in the present embodiment) in the front-rear direction, the opening 29 of the slot 28 is disposed on the rear surface 22. In other words, battery modules adjacent to each other in the front-rear direction are arranged such that surfaces on which the openings 29 are formed are not adjacent to each other.

Also in this example, since the adjacent battery modules 10 are arranged such that the positive electrode current collector tab 31 and the negative electrode current collector tab 32 are not adjacent to each other, it is possible to prevent local expansion in the battery pack 1.

Second Embodiment

Figure 9:
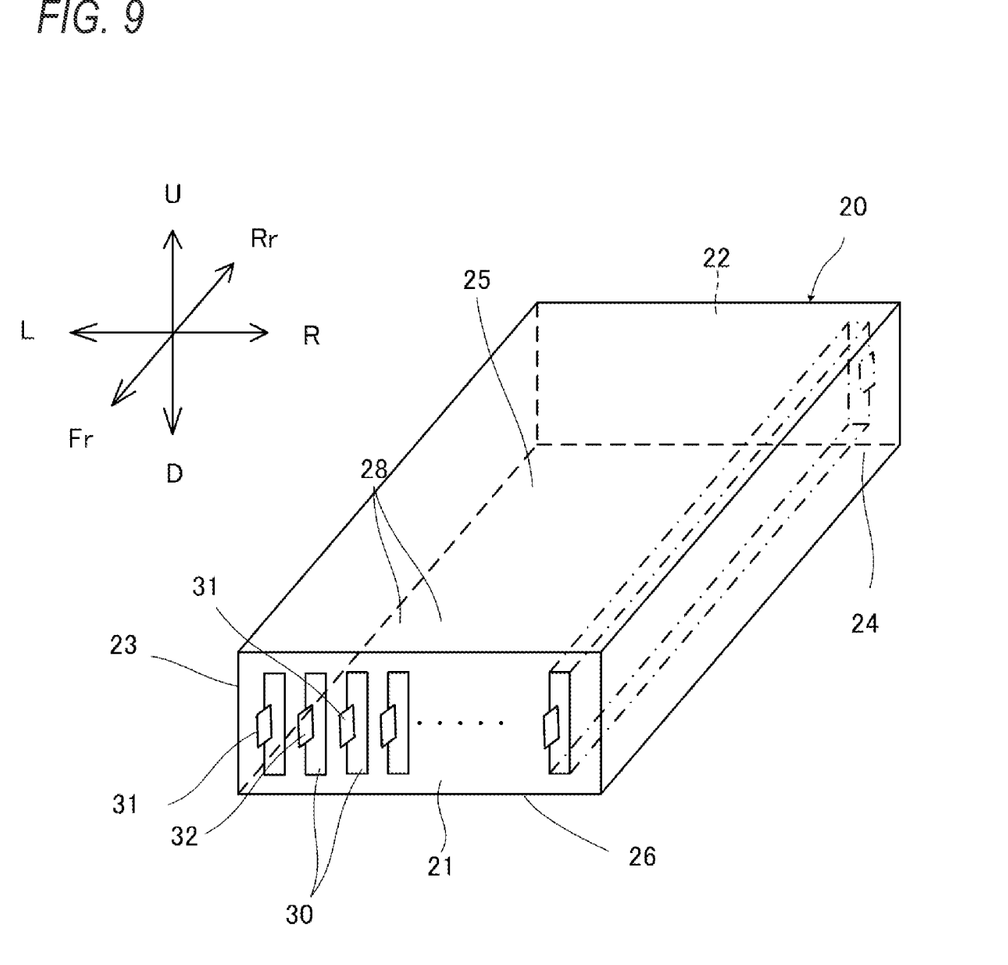
FIG. 9 is a perspective view of a battery module according to a second embodiment of the present disclosure.
Figure 10:
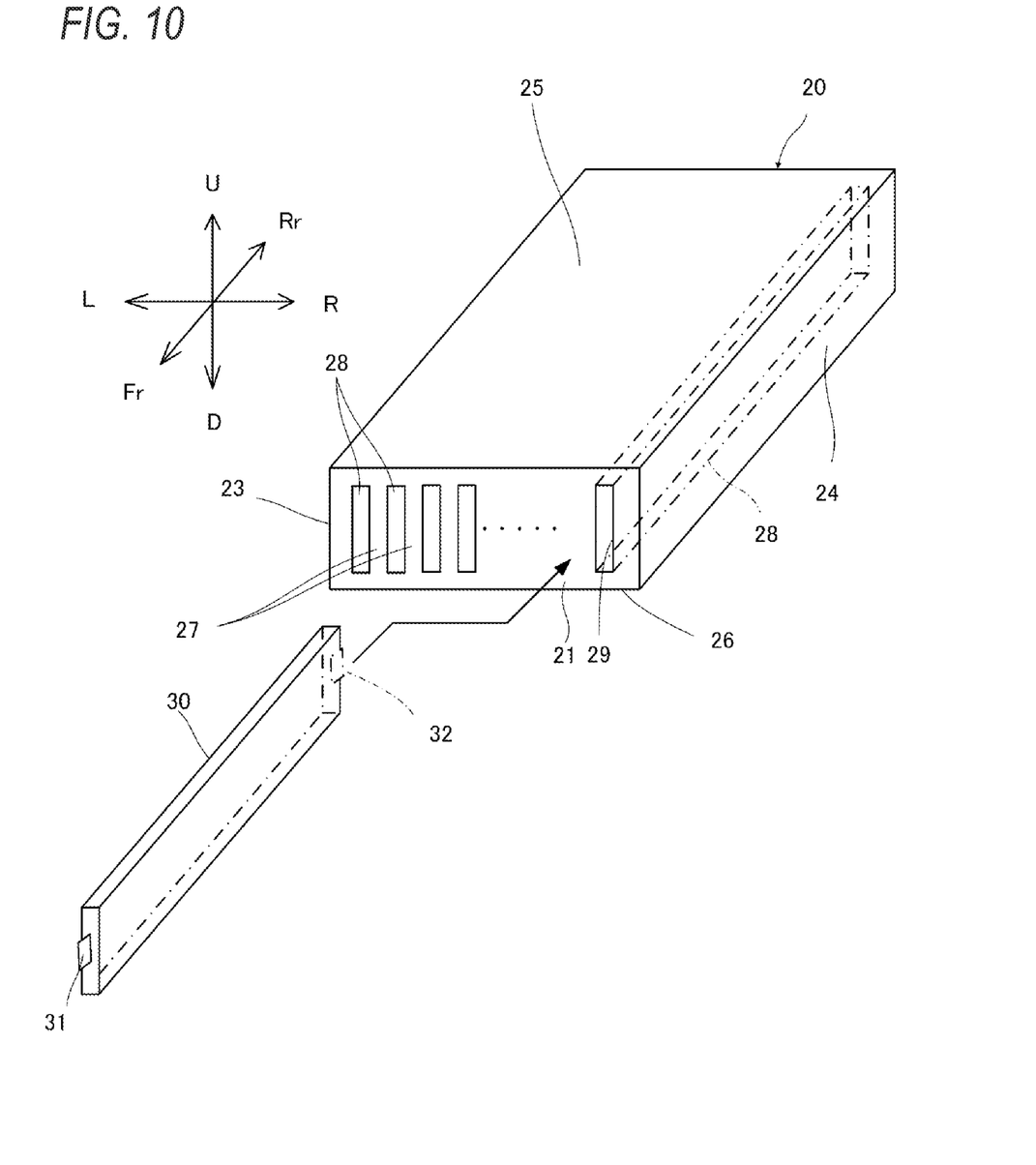
FIG. 10 is an explanatory view illustrating a step of inserting a solid-state battery cell into a slot of a cushion block in the battery module of FIG. 9.

FIG. 9 is a perspective view of the battery module 10 according to a second embodiment of the present disclosure, and FIG. 10 is an explanatory view illustrating a step of inserting the solid-state battery cell 30 into the slot 28 of the cushion block 20 in the battery module 10 of FIG. 9.

The battery module 10 of the second embodiment is the same as that of the first embodiment except that the positive electrode current collector tab 31 and the negative electrode current collector tab 32 are provided on opposite sides in the front-rear direction, and the slot 28 of the cushion block 20 penetrates in the front-rear direction.

Also in such the battery module 10, since a plurality of solid-state battery cells 30 are inserted into a plurality of slots 28, expansion or contraction of the solid-state battery cells 30 is absorbed by elasticity of the cushion block 20.

Further, since the solid-state battery cells 30 are inserted into the slots 28 provided in the cushion block 20, a shape of the slots 28 can be designed regardless of a shape of the solid-state battery cells 30. Note that the cushion blocks 20 in the first modification to the fourth modification are also applicable to the battery module 10 of the second embodiment.

Although various embodiments have been described above with reference to the drawings, it is needless to say that the present disclosure is not limited to such an example. It is apparent to those skilled in the art that various changes and modifications can be conceived within the scope of the claims, and it is also understood that such variations and modifications belong to the technical scope of the present disclosure. In addition, constituent elements in the embodiments described above may be combined freely within a range not departing from the spirit of the present disclosure.

In the present specification, at least the following matters are described. Although corresponding components or the like in the above embodiment are shown in parentheses, the present disclosure is not limited thereto.

(1) A battery module (battery module 10) including:
a plurality of solid-state battery cells (solid-state battery cells 30) arranged in a first direction (left-right direction) and extending in a second direction (front-rear direction) orthogonal to the first direction; and
a cushion block (cushion block 20) having elasticity and provided with a plurality of slots (slots 28) which accommodate the plurality of solid-state battery cells, in which
the battery module is configured by inserting the plurality of solid-state battery cells into the plurality of slots.

According to (1), since the battery module is configured by inserting the solid-state battery cells into the slots provided in the cushion block, a shape of the slots can be designed regardless of a shape of the solid-state battery cells. Further, since the solid-state battery cells are accommodated in the slots of the cushion block having elasticity, expansion or contraction of the solid-state battery cells can be absorbed by the elasticity of the cushion block.

(2) The battery module according to (1), in which the cushion block is an elastomer.

According to (2), the expansion or contraction of the solid-state battery cells can be appropriately absorbed.

(3) The battery module according to (2), in which the elastomer is a silicone-based, fluorine-based, urethane-based, amide-based, olefin-based, styrene-based, ester-based, or vinyl chloride-based elastomer.

According to (3), the expansion or contraction of the solid-state battery cells can be more appropriately absorbed.

(4) The battery module according to any one of (1) to (3), in which
the cushion block is provided to surround an outer periphery of the solid-state battery cells in a cross section orthogonal to the second direction.

According to (4), restorability of the cushion block is improved, and the expansion or contraction of the solid-state battery cells can be further absorbed.

(5) The battery module according to any one of (1) to (4), in which,
the cushion block has through holes (through holes 41) which communicate a first surface (lower surface 26) of the cushion block with the slots.

According to (5), the solid-state battery cells can be cooled through the through holes.

(6) The battery module according to (5), in which the first surface is a surface extending along a water jacket (water jacket 50).

According to (6), the solid-state battery cells can be further cooled through the through holes.

(7) The battery module according to (5) or (6), in which:
the solid-state battery cells are inserted from openings of the slots along the second direction; and
the through holes are inclined to be closer to the slots from the first surface as a distance from the openings in the second direction increases.

According to (7), when the solid-state battery cells are inserted into the slots, the through holes are less likely to be caught on the solid-state battery cells.

(8) The battery module according to any one of (1) to (7), in which:
the solid-state battery cells are inserted from openings (openings 29) of the slots along the second direction; and
the slots are provided with guide portions (guide portions 40 and 45) which are inclined or curved such that a width of each of the slots narrows as a distance from the openings increases in the second direction in a state where the solid-state battery cells are not inserted.

According to (8), when the solid-state battery cells are inserted into the slots, the solid-state battery cells can be easily inserted into the slots by the guide portions.

(9) The battery module according to (8), in which:
the slots are provided with protrusions (first protrusions 43 and second protrusions 44); and
in the protrusions,
the guide portions (guide portions 45) are provided on an opening side, and
hook portions (hook portions 46) are provided on a side opposite to the opening side in the second direction, the hook portions being inclined such that the width of each of the slots increases as the distance from the openings increases in the second direction.

According to (9), even if vibration or the like acts on the solid-state battery cells after the solid-state battery cells are inserted into the slots, the solid-state battery cells are less likely to come off due to the hook portions.

(10) A battery pack (battery pack 1) provided with a plurality of battery modules according to any one of (1) to (9), in which:

the solid-state battery cells are provided with positive electrode terminals (positive electrode current collector tabs 31) and negative electrode terminals (negative electrode current collector tabs 32) on one side in the second direction;

the positive electrode terminals and the negative electrode terminals of the solid-state battery cells are exposed from openings (openings 29) of the slots;

the openings of the slots are provided on a second surface (front surface 21) of the cushion block; and adjacent battery modules are disposed such that second surfaces thereof are not adjacent to each other.

The solid-state battery cells tend to expand and contract greatly in the vicinity of the positive electrode terminals and the negative electrode terminals. According to (10), since the adjacent battery modules are disposed such that the positive electrode terminals and the negative electrode terminals are not adjacent to each other, it is possible to prevent expansion of the battery modules from accumulating at the same position in the battery pack.

(11) A method for manufacturing a battery module, the method including:

generating a plurality of slots (slots 28) arranged in a first direction (left-right direction) and extending in a second direction (front-rear direction) orthogonal to the first direction in a cushion block having elasticity; and inserting the plurality of solid-state battery cells into the plurality of slots.

According to (11), since the battery module is configured by inserting the solid-state battery cells into the slots provided in the cushion block, a shape of the slots can be designed regardless of a shape of the solid-state battery cells. Further, since the solid-state battery cells are inserted into the slots of the cushion block having elasticity, expansion or contraction of the solid-state battery cells can be absorbed by the elasticity of the cushion block.

The invention claimed is:

1. A battery module comprising:
a plurality of solid-state battery cells arranged in a first direction and extending in a second direction orthogonal to the first direction; and
a cushion block having elasticity and provided with a plurality of slots which accommodate the plurality of solid-state battery cells, wherein
the battery module is configured by inserting the plurality of solid-state battery cells into the plurality of slots,
the cushion block has through holes which communicate a first surface of the cushion block with the slots,
the solid-state battery cells are inserted from openings of the slots along the second direction, and
the through holes are inclined to be closer to the slots from the first surface as a distance from the openings in the second direction increases.

2. The battery module according to claim 1, wherein the cushion block is an elastomer.

3. The battery module according to claim 2, wherein the elastomer is a silicone-based, fluorine-based, urethane-based, amide-based, olefin-based, styrene-based, ester-based, or vinyl chloride-based elastomer.

4. The battery module according to claim 1, wherein the cushion block is provided to surround an outer periphery of the solid-state battery cells in a cross section orthogonal to the second direction.

5. The battery module according to claim 1, wherein the first surface is a surface extending along a water jacket.

6. A battery module comprising:
a plurality of solid-state battery cells arranged in a first direction and extending in a second direction orthogonal to the first direction; and
a cushion block having elasticity and provided with a plurality of slots which accommodate the plurality of solid-state battery cells, wherein
the battery module is configured by inserting the plurality of solid-state battery cells into the plurality of slots,
the solid-state battery cells are inserted from openings of the slots along the second direction,
the slots are provided with guide portions which are inclined or curved such that a width of each of the slots narrows as a distance from the openings increases in the second direction in a state where the solid-state battery cells are not inserted,
the slots are provided with protrusions, and
in the protrusions,
the guide portions are provided on an opening side, and hook portions are provided on a side opposite to the opening side in the second direction, the hook portions being inclined such that the width of each of the slots increases as the distance from the openings increases in the second direction.

7. A battery pack provided with a plurality of battery modules according to claim 1, wherein
the solid-state battery cells are provided with positive electrode terminals and negative electrode terminals on one side in the second direction,
the positive electrode terminals and the negative electrode terminals of the solid-state battery cells are exposed from openings of the slots,
the openings of the slots are provided on a second surface of the cushion block, and
adjacent battery modules are disposed such that second surfaces thereof are not adjacent to each other.

8. A method for manufacturing a battery module, the method comprising:
generating a plurality of slots arranged in a first direction and extending in a second direction orthogonal to the first direction in a cushion block having elasticity; and
inserting a plurality of solid-state battery cells into the plurality of slots, wherein
inserting the plurality of solid-state battery cells into the plurality of slots includes inserting the solid-state battery cells from openings of the slots along the second direction, and
generating a plurality of slots includes providing the cushion block with through holes which communicate a first surface of the cushion block with the slots, the through holes being inclined to be closer to the slots from the first surface as a distance from the openings in the second direction increases.

9. A battery pack provided with a plurality of battery modules according to claim 6, wherein
the solid-state battery cells are provided with positive electrode terminals and negative electrode terminals on one side in the second direction,
the positive electrode terminals and the negative electrode terminals of the solid-state battery cells are exposed from openings of the slots,
the openings of the slots are provided on a second surface of the cushion block, and
adjacent battery modules are disposed such that second surfaces thereof are not adjacent to each other.

10. A method for manufacturing a battery module, the method comprising:
- generating a plurality of slots arranged in a first direction and extending in a second direction orthogonal to the first direction in a cushion block having elasticity;
- inserting a plurality of solid-state battery cells into the plurality of slots, wherein
- inserting the plurality of solid-state battery cells into the plurality of slots includes inserting the solid-state battery cells from openings of the slots along the second direction, and
- generating the plurality of slots includes:
  - providing the slots with protrusions; and
  - providing the protrusions with guide portions on an opening side of the protrusions, the guide portions being inclined or curved such that a width of each of the slots narrows as a distance from the openings increases in the second direction in a state where the solid-state battery cells are not inserted; and
  - providing the protrusions with hook portions on a side opposite to the opening side of the protrusions in the second direction, the hook portions being inclined such that the width of each of the slots increases as the distance from the openings increases in the second direction.

11. The battery module according to claim 1, wherein the first surface of the cushion block is one of side surfaces in a third direction orthogonal to the first direction and the second direction.

12. The battery module according to claim 6, wherein the solid-state battery cells are accommodated in the slots in a state in which tip end portions of the solid-state battery cells are arranged beyond hook portions in the slots.

* * * * *